Figure 1:
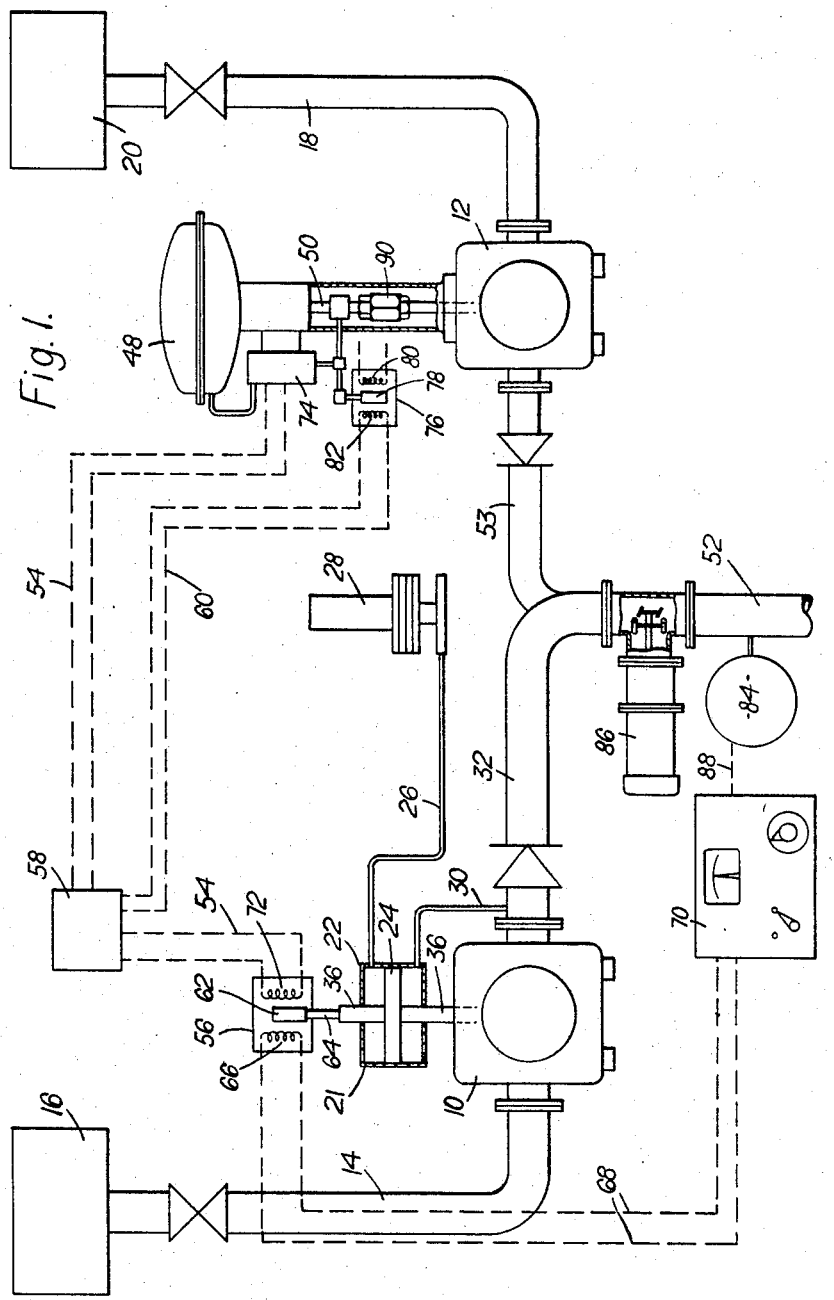

United States Patent Office

3,415,264
Patented Dec. 10, 1968

3,415,264
BLENDERS FOR BLENDING TWO
OR MORE LIQUIDS
Stanley Graham Brown, Newbury, and Michael Arthur
Howard Walford, Baughurst, near Basingstoke, England,
assignors to Plenty and Son Limited, Newbury, England
Filed Dec. 5, 1963, Ser. No. 328,216
Claims priority, application Great Britain, Dec. 6, 1962,
46,140/62
12 Claims. (Cl. 137—92)

This invention relates to blenders for blending two or more liquids, and is particularly concerned with blending installations having two or more pumps arranged to handle two or more different kinds of fuel oil, for example diesel oil and heavy fuel oil.

In installations where a pair of variable-capacity pumps are used to produce a blend of two liquids, it is usual to connect the capacity-adjusting devices of the pumps together by a mechanical linkage so that, when the rate of flow of the liquid blend is reduced or increased, the ratio of the two liquids in the blend remains the same. In actual practice however this ratio tends to vary to some extent at different outputs from the pumps due to such factors as minor inaccuracies in the operational characteristics of the pumps and the different viscosities and handling qualities of the two liquids. It is therefor an aim of the present invention to connect the capacity-adjusting devices together in such a way that the ratio of the two liquids is properly maintained at its desired value irrespective of changes in the outputs of the pumps.

According to the invention, a blender for blending two or more liquids comprises two variable-capacity pumps, one for each liquid, having capacity-adjusting devices electrically linked together by a control circuit which includes means sensitve to variations in the capacity of one of the pumps, the said means being arranged to supply an electrical signal corresponding to the capacity of that pump to the capacity-adjusting device of the other pump so that the capacity of the latter is adjusted proportionately as and when adjustments are made in the capacity of the first pump.

Preferably the signal-supplying means take the form of a differential transformer the primary coil of which is energised by a predetermined voltage and the secondary coil of which is connected electrically to the capacity-adjusting device of the second pump. By mounting the transformer core for longitudinal movement with a moving part of the capacity-adjusting device of the first pump, the voltage appearing on the secondary coil of the transformer will then be proportional to the capacity of that pump. In the best arrangement provision will also be made for varying the voltage applied to the primary coil of the transformer in accordance with one or more characteristics of the blend delivered by the pumps—for example, the viscosity, specific gravity of pH value of the blend. This gives the installation greater sensitivity in maintaining the desired ratio between the two liquids.

Figure 2:
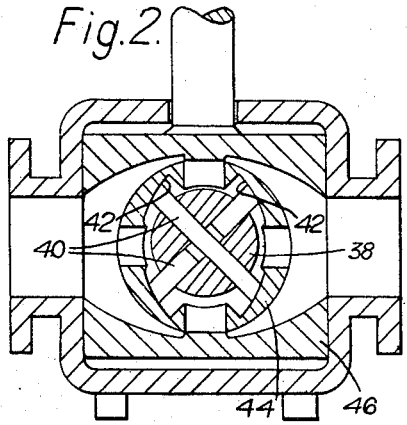
Figure 3:
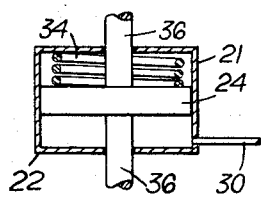
Figure 4:
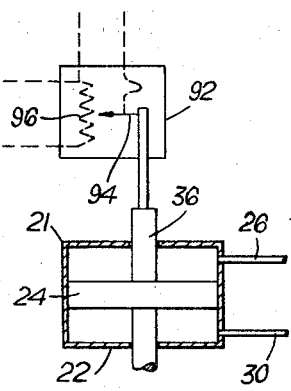

An example of a blending installation in accordance with the invention is shown in the accompanying drawings, in which:

FIGURE 1 is a diagrammatic view of the installation;
FIGURE 2 is a vertical section through one of the pumps in the installation; and
FIGURES 3 and 4 illustrate modifications to the installation of FIGURE 1.

The installation shown in FIGURE 1 comprises two pumps 10 and 12 of the variable-capacity sliding vane type one of which is connected by a pipe 14 on its suction side to a source 16 of heavy fuel oil and the other of which is connected by a pipe 18 on its suction side to a source 20 of diesel oil. The pump 10 handling the heavy fuel oil is constructed in accordance with the invention claimed in our prior British Patent No. 689,313 and is provided with a capacity-adjusting device 21 which takes the form of an hydraulic cylinder 22 and piston 24 mounted on top of the pump, the space within the cylinder above the piston 24 being connected by a pipe 26 to an hydraulic accumulator 28 which thus applies a constant hydraulic pressure to the upper surface of the piston while the space below the piston is connected by a pipe or passage 30 to the pipe 32 on the delivery side of the pump so that the delivery pressure is applied to the under surface of the piston. Alternatively, instead of providing the hydraulic accumulator 28, the space within the cylinder 22 above the piston 24 can contain a spring 34 under compression as shown in FIGURE 3, the spring thus exerting a downward thrust on the piston. In both cases the piston 24 has a piston rod 36 which extends upwards through the upper end of the cylinder 22.

The internal construction of each of the pumps 10 and 12 is illustrated in FIGURE 2. From this it will be seen that a rotor shaft 38 in each pump is provided with diagonal slots which receive sliding vanes 40 the outer ends of which bear on flat surfaces 42 formed internally on a rotor 44 surrounding the shaft. The rotor 44 is mounted for rotation in a hollow block 46 which is able to slide up and down over a limited distance within the casing. Such movement of the block 46 causes the relative eccentricity of the shaft 38 and the rotor 44 to be varied, and this in turn varies the volumetric capacity of the pump.

In the case of the pump 10, movement of the sliding block 46 is effected by the hydraulic cylinder 22 and piston 24 through the piston rod 36 which extends downwards so as to be connected at its lower end to the block. The pump 12 is provided with a pneumatically-actuated, capacity-adjusting device 48 for the same purpose, the device 48 being provided with a piston rod 50 which is connected at its lower end to the sliding block of the pump.

During operation of the installation the two pumps 10 and 12 are driven by separate constant-speed electric motors (not shown) so as to deliver their respective oils into a common delivery main 52 through the passages 32 and 53. The ratio of the two liquids in the blend is determined in advance, and it will therefore be clear that if the ratio of the liquid in the blend is to be maintained, it is important to ensure that when the capacity of one pump is varied in accordance with rises or falls in demand, the capacity of the other pump is varied correspondingly. To meet this requirement the two capacity-adjusting devices 21 and 48 are linked to each other by an electrical control circuit 54 which includes a differential transformer 56, a standard 3 term controller 58 and a positionel feedback circuit 60. The transformer 56 is arranged on top of the pump 10 and is provided with a movable core 62 mounted on an upwardly-projecting extension 64 of the piston rod 36. The primary coil 66 of the transformer is energised through electrical conductors 68 by a predetermined voltage from a main controller 70, while the secondary coil 72 is electrically connected through the 3 term controller 58 to the capacity-adjusting device 48 of the second pump 12. By providing such an arrangement in which any adjustments in the capacity of the first pump 10 cause corresponding adjustments in the position of the transformer core 62 the voltage across the secondary coil 72 will always be a measure of the capacity of the pump 10, provided of course that the voltage supplied to the primary coil 66 of the transformer remains substantially constant. In practice the output voltage of the main controller 70 is adjusted before the pumps begin pumping so as to respond to the desired ratio of the two liquids in the blend, after which the output voltage remains substantially constant. The capacity-adjusting device 48 of the second pump 12 includes means 74 sensitive to changes in the secondary voltage and arranged to influence the device 48 so that it adjusts the capacity of the second pump 12 in accordance with such changes. Thus, any adjustment in the capacity of the first pump 10 automatically gives rise to a corresponding adjustment in the capacity of the second pump 12.

The positional feedback circuit 60 serves to increase the accuracy of the adjustments made in the capacities of the pumps. It can take a number of forms, and in this instance comprises a second differential transformer 76 the moving core 78 of which is connected to a part on the piston rod 50 of the capacity-adjusting device 48 of the second pump 12. The primary coil 80 is supplied with a predetermined voltage from a source not shown in the drawings, and the secondary coil 82 is connected back to the 3 term controller 58.

It could reasonably be expected that, with the application of a predetermined constant voltage to the primary coil 66 of the main differential transformer 56, such an arrangement would ensure that the ratio of the two liquids in the blend would always remain the same irrespective of the rate at which the liquid blend is delivered from the pumps. In actual practice however the ratio tends to vary somewhat as the pump outputs are altered, and provision is therefore made for the detection of deviations from the correct ratio by measuring the viscosity, specific gravity, pH value or some other characteristic of the blend. For example, a viscosity-measuring instrument 84 can be included in the main passage 52 which carries the blend away from the installation. The constituent liquids of the blend are thoroughly mixed together by a mixer 86 upstream of the viscosity-measuring instrument, and the latter is designed to provide an electrical signal which is passed along the conductor 88 through the main controller 70 to the primary coil 66 of the transformer 56. Should the viscosity be too low, indicating there is too much heavy fuel oil in the blend, then the signal from the instrument 84 will cause a change in the signal given by the transformer 56 to the capacity-varying device 48 of the pump 12 handling the diesel oil so that the ratio of the heavy fuel oil to diesel oil is reduced. If, on the other hand, the signal produced by the viscosity-measuring instrument corresponds to a viscosity which is too high, indicating that there is too much diesel oil in the blend, then the signal given by the transformer 56 will result in an appropriate adjustment of the capacity of the diesel oil pump 12 so that the ratio of the heavy fuel oil to diesel oil is increased.

Due to the fact that the pumps 10 and 12 are handling two different liquids, the amount of pump slip or volumetric inefficiency in the pump 12 handling the diesel oil may be considerably larger than in the pump 10 handling the heavy fuel oil. It is necessary therefore that the capacity-adjusting device of one of the pumps should be adjustable in relation to the capacity-adjusting device of the other pump so that both pumps can achieve zero output at the same setting. One simple way of making this possible is to break the piston rod 50 of the device 48 in two, and to join the two parts by an adjusting nut 90 so that the distance between the capacity-adjusting device 48 and the capacity-adjusting sliding block 46 arranged within the pump casing can be varied.

The installation described above can be modified in a number of respects. For example, the pneumatic capacity-adjusting device 48 of the second pump 12 can be replaced by a device which is actuated hydraulically, mechanically or electrically. Similarly, the differential transformer 56 mounted on the first pump 10 can be replaced by a precision wound potentiometer 92 as shown in FIGURE 4, the potentiometer having a wiper arm or finger 94 which is connected to or forms part of the piston rod 36 which is associated with the pump 10 handling the heavy fuel oil. On energisation of the potentiometer 92 from the controller 70, any changes in the setting of the capacity-adjusting device 21 of the pump 10 handling the heavy fuel oil are transmitted through the wiper arm 94 and the potentiometer winding 96 to the capacity-adjusting device 48 of the other pump 12.

Although the pumps themselves may be of quite massive construction, the electrical linkage between their capacity-adjusting devices 21 and 48 weighs very little and takes up only a small amount of space. Moreover, the differential transformer 56, the potentiometer 92 and the other components 58, 74 and 76 associated with the said linkage between the two devices are freely available commercially.

We claim:

1. A blender for blending two or more liquids comprising two variable-capacity pumps, one for each liquid, said pumps having a common outlet; said pumps having capacity-adjusting devices electrically linked together by a control circuit which includes means sensitive to variations in the capacity of one of the pumps, means for varying the capacity of said one pump in response to the outlet pressure of said one pump, the said means sensitive to variations in the capacity being arranged to supply an electrical signal corresponding to the capacity of said one pump to the capacity-adjusting device of the other pump so that the capacity of the latter is adjusted proportionately as and when adjustments are made in the capacity of said one pump.

2. A blender according to claim 1, in which said means sensitive to variations in the capacity include a differential transformer the primary coil of which is connected electrically to a controlled voltage source and the secondary coil of which is connected electrically to the capacity-adjusting device of said other pump.

3. A blender according to claim 2, in which the core of the transformer is mounted for longitudinal movement with a moving part of the capacity-adjusting device of said one pump.

4. A blender according to claim 2, in which the controlled voltage source has an electrical connection to an instrument arranged to measure some characteristic of the blend and to pass an electrical correcting signal to the said voltage source if the measurements thus made detect a deviation from the predetermined ratio of the liquids in the blend.

5. A blender according to claim 2, in which the controlled voltage source includes means for adjusting its output voltage so as to change the ratio of the liquids in the blend.

6. A blender according to claim 1, in which said means sensitive to variations in the capacity include a potentiometer the winding of which is connected electrically to a controlled voltage source and the wiper arm of which is connected electrically to the capacity-adjusting device of said other pump.

7. A blender according to claim 1, in which the capacity-adjusting device of said one pump comprises a cylinder and piston assembly having a passage leading from the space on one side of the piston to the delivery side of the pump.

8. A blender according to claim 1, in which the electrical connection between the capacity-adjusting devices of the two pumps includes a positional feedback circuit; the positional feedback circuit including a differential transformer the core of which is mounted for longitudinal movement with a moving part of the capacity-adjusting device of the second pump.

9. A blender for blending two liquids comprising: two variable capacity pumps, one for each liquid; said pumps having a common outlet; a capacity control device for controlling at constant pressure the capacity of the first pump responsive to the outlet pressure of said first pump and including a cylinder and piston assembly in which a bias is applied to one side of the piston and the outlet pressure of the first pump is applied to the other side, the piston being connected to a capacity adjusting means of the first pump; an electric circuit including electrical sensing means connected to the capacity control device of the first pump and arranged to provide a signal indicative of the capacity of the first pump, and electric circuit means including means to vary the capacity of the second pump responsive to the said signal and operatively arranged to vary the capacity of the second pump dependent upon the desired ratio of the capacity of the second pump to that of the first.

10. A blender as claimed in claim 9 in which electrical senesing means is connected to the capacity adjusting means of the second pump and arranged to feed back to the electric circuit means a signal indicative of the position of the capacity adjusting means of the second pump.

11. A blender as claimed in claim 9 in which means are provided to impress an electrical actuating signal on the electrical sensing means, the said actuating signal being indicative of said desired ratio, and means for measuring a parameter in the outlet from the blender and for modifying said signal in accordance with said measured parameter.

12. A blender for blending two liquids comprising: two variable capacity pumps, one for each liquid; said pumps having a common outlet; a capacity control means for controlling at constant pressure the capacity of the first pump responsive to the outlet pressure of the first pump; an electrical circuit including a differential transformer connected to the capacity control means of the first pump and arranged to provide a signal indicative of the capacity of the first pump; electric circuit means responsive to the said signal and operatively arranged to vary the capacity of the second pump dependent upon the desired ratio of the capacity of the second pump to that of the first.

References Cited

UNITED STATES PATENTS

| | | | |
|---|---|---|---|
| 862,867 | 8/1907 | Eggleston | 251—61.1 X |
| 1,450,023 | 3/1923 | Edelman | 137—91 X |
| 2,713,788 | 7/1955 | Goff | 137—91 X |
| 2,833,298 | 5/1958 | Shannon | 137—85 |
| 3,017,865 | 1/1962 | Frantz et al. | 91—361 X |
| 3,250,218 | 5/1966 | Sinclair | 137—88 X |
| 2,698,141 | 12/1954 | Dickey et al. | 137—101.19 |
| 2,958,310 | 11/1960 | Shoosmith | 103—11 X |
| 3,038,486 | 6/1962 | Thurman | 137—101.21 X |
| 3,044,029 | 7/1962 | Pegram | 323—51 X |
| 3,225,289 | 12/1965 | Koppel et al. | 323—51 |

WILLIAM F. O'DEA, *Primary Examiner.*

D. J. ZOBKIW, *Assistant Examiner.*

U.S. Cl. X.R.

103—11, 35; 91—361; 137—101.19